Sept. 27, 1960   A. J. DEVAUD ET AL   2,954,265
APPARATUS FOR ANALYZING THE MOTION OF
A MOVABLE MACHINE ELEMENT
Filed May 3, 1955   3 Sheets-Sheet 1

INVENTORS
ALBERT J. DEVAUD
ALBERT ENG
BY
ATTORNEY

Sept. 27, 1960  A. J. DEVAUD ET AL  2,954,265
APPARATUS FOR ANALYZING THE MOTION OF
A MOVABLE MACHINE ELEMENT
Filed May 3, 1955  3 Sheets-Sheet 2
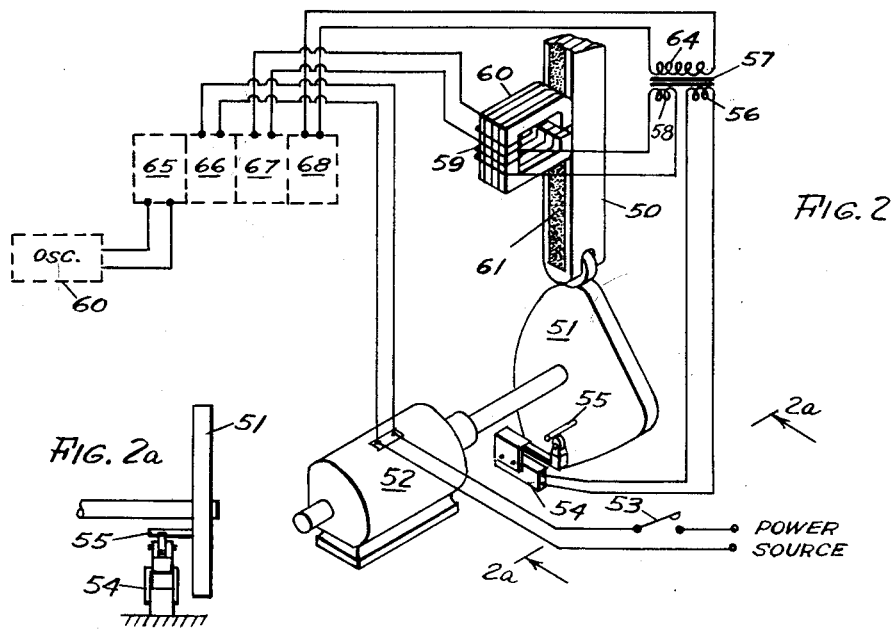
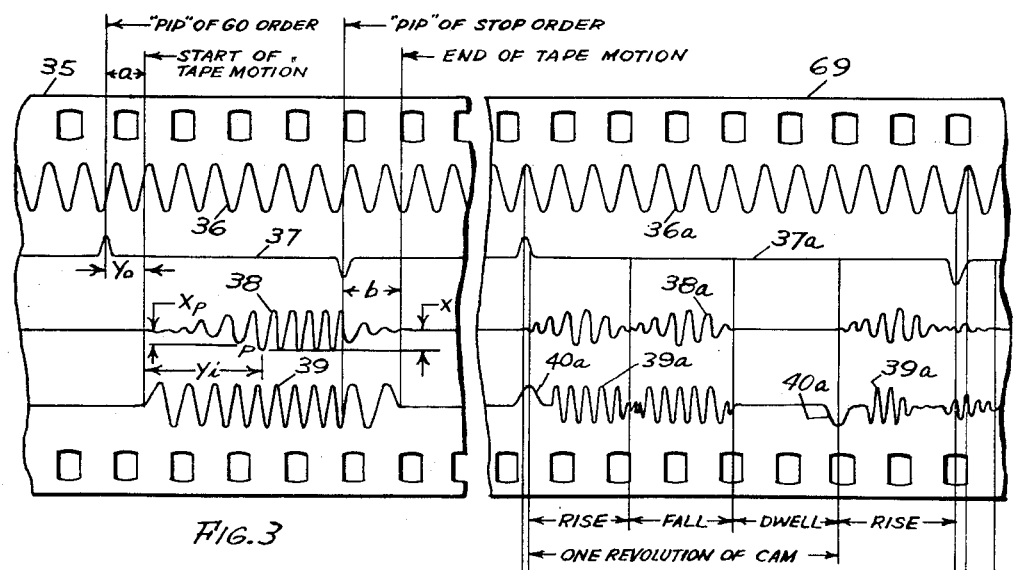
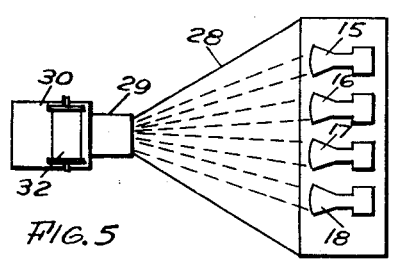
INVENTORS
ALBERT J. DEVAUD
ALBERT ENG
BY Elmer J. Gorn
ATTORNEY Sept. 27, 1960     A. J. DEVAUD ET AL     2,954,265
APPARATUS FOR ANALYZING THE MOTION OF
A MOVABLE MACHINE ELEMENT
Filed May 3, 1955     3 Sheets-Sheet 3
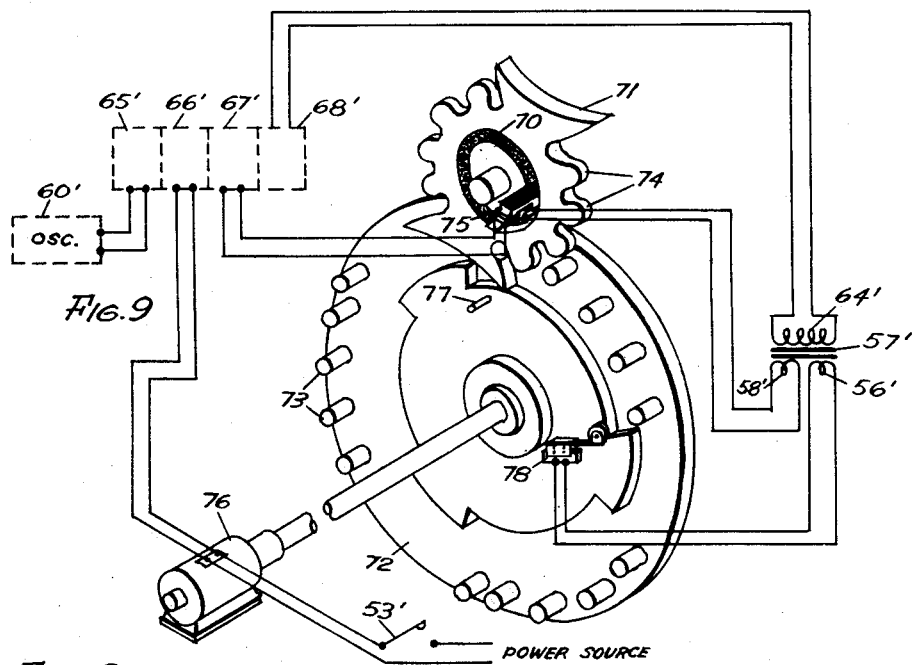
Fig. 9
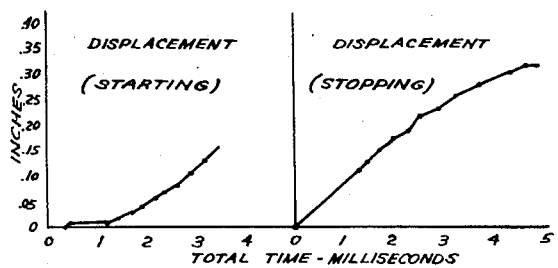
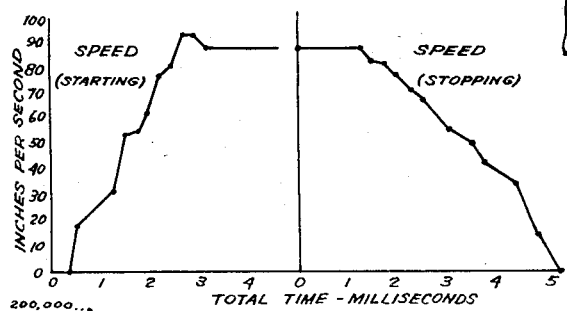
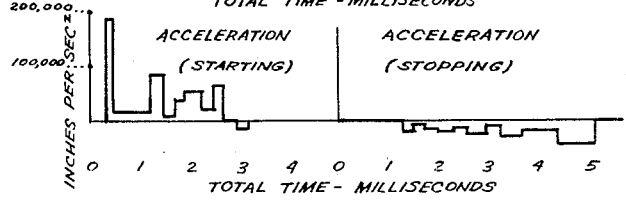
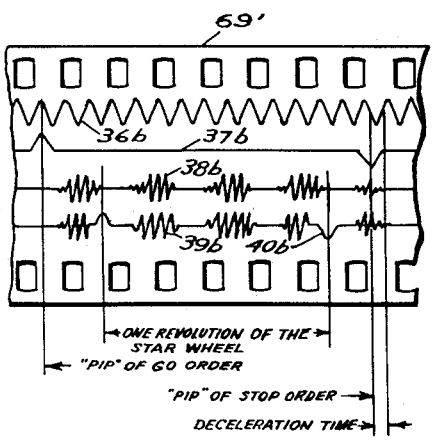
Fig. 7     Fig. 10
INVENTORS
ALBERT J. DEVAUD
ALBERT ENG
Fig. 8
By Elmer J. Gorn
ATTORNEY

United States Patent Office 2,954,265
Patented Sept. 27, 1960

2,954,265
APPARATUS FOR ANALYZING THE MOTION OF A MOVABLE MACHINE ELEMENT

Albert J. Devaud, Waltham, and Albert Eng, Brookline, Mass., assignors, by mesne assignments, to Minneapolis-Honeywell Regulator Company, a corporation of Delaware Filed May 3, 1955, Ser. No. 505,584

3 Claims. (Cl. 346—33)

This invention relates to motion analysis, and particularly to methods and means for determining and measuring the displacement, velocity, and acceleration of a machine element or material adapted to travel in a prescribed path.

The invention is characterized by the use of combined electronic and photographic procedures and devices for obtaining a time-based permanent record of the performance of a continuously or intermittently driven machine element or material, such as a magnetic tape, cam follower, or similar rectilinearly moving unit whose dynamic characteristics are to be registered.

More specifically stated, the invention embraces the concept of recording on a moving camera film one or more oscillating wave patterns representative of the performance of the machine element to be analyzed, the film record being produced by exposing the moving film in the path of light rays emerging from the screen of a cathode ray tube or tubes whose electron beam emitting electrodes are energized by electric energy generated in a magnetic or photoelectric reading head disposed alongside the path traversed by a magnetic tape or other magnetically or photographically treated element whose motion or dynamic pattern is to be recorded.

Other characteristics and purposes of the invention will be apparent upon reference to the following description of the invention as illustrated in the accompanying drawings wherein:

Figs. 1, 2 and 9 show apparatus for recording performance data relating to a magnetic tape drive, a reciprocable cam follower, and a Geneva "star-wheel" drive, respectively;

Figs. 1a and 2a are transverse views along lines 1a—1a and 2a—2a, respectively, of Figs. 1 and 2;

Figs. 3, 4 and 10 are representations of film records obtained by the apparatus of Figs. 1, 2, and 9, respectively;

Fig. 5 is a plan view of part of the apparatus common to Figs. 1, 2, and 9; and

Figs. 6, 7 and 8 are graphs tabulating the data recorded on the film of Fig. 1.

Figure 1:
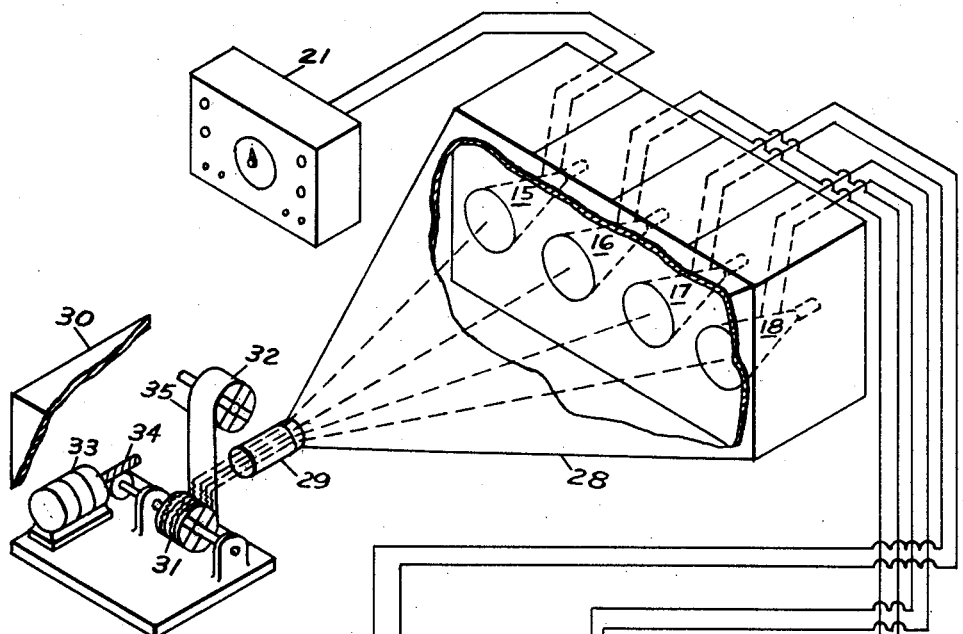
Figure 1A:
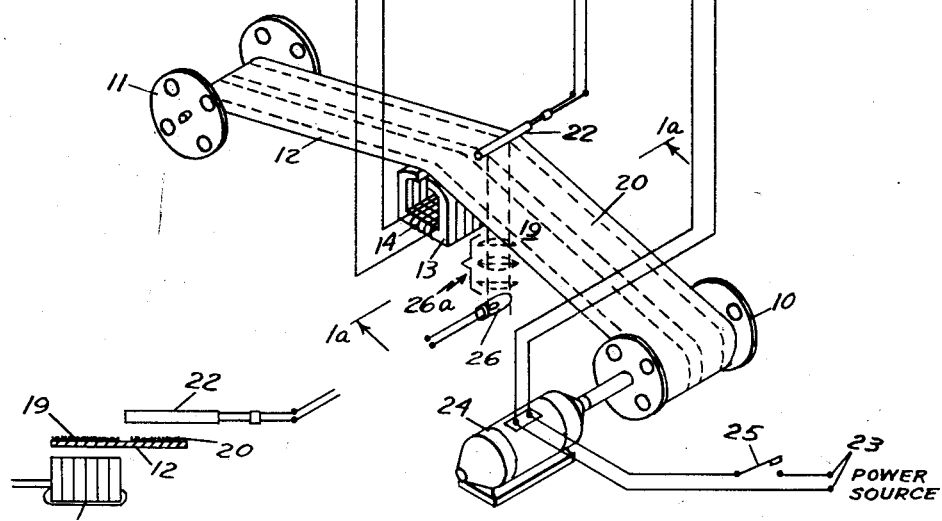

Referring first to Fig. 1, reference numerals 10 and 11 designate rollers constituting driving and paying-out means, respectively, for a magnetic tape 12 adapted to cooperate with a magnetic reading head 13 to generate current pulses in the windings 14 thereon, for delivery to the electron beam deflecting electrodes of a cathode ray tube 17. The portions of the tape 12 which moves within the projected area of reading head 13 carries magnetic material, as indicated at 19, which material has had impressed upon it a magnetic record by reason of having previously been caused to travel past a magnetizing unit at constant speed, thereby causing a magnetic pattern of constant repetitive frequency to be impressed thereon.

A second portion of the tape 12 has a light-sensitive track 20 formed thereon, which track has had impressed upon it a photographic record by reason of having previously been passed through a recording process at constant speed, to produce a photographic pattern of constant repetitive frequency. As shown, track 20 is located on that part of the film 12 which, in its normal travel, intercepts the beam of light originating at source 26 and directed by lenses 26a through the film 12 and into impingement with photoelectric cell, or tube 22.

In addition to the above described cathode ray tube 17, the system of Fig. 1 utilizes three similar cathode ray tubes 15, 16 and 18, whose beam deflecting electrodes receive control voltage from units 21, 22, and 23, respectively. Unit 21 is an oscillating current generator operable to supply tube 15 with a time base signal of constant frequency. Unit 22 (described above) supplies tube 18 with beam deflecting voltage whose pattern corresponds to the photographic record 20 preimpressed on tape 12; and unit 23 is the source of energy feeding motor 24 which drives the tape actuating roller 10. Switch 25 controls the starting and stopping of motor 24, and thus controls the transmission of signal voltage to tube 16.

The translucent screens of tubes 15–18 are disposed at the wide end of a tapering bellows chamber 28 whose narrow end converges upon the lens holder 29 of a camera 30 housing film winding and unwinding reels 31 and 32, the former being driven by constant speed motor 33 and reduction gearing 34. As the film 35 travels vertically from reel 32 to reel 31, it has recorded thereon four light tracks 36, 37, 38, and 39 (see Fig. 3) representing the aggregate of the instantaneous oscillograms successively appearing on the screens of tubes 15 to 18 throughout the cycle of operation of tape drive 10.

Light track 36, being the product of regularly recurring output signals from constant-frequency oscillator 21, is in the form of evenly spaced sine waves, and therefore serves as a time base reference datum, facilitating the measurement of the exact time relationship marking events recorded on tracks 37, 38, and 39.

Light track 37 accurately records the instant of the "go" and "stop" signals produced by the alternate closing and opening of switch 25. The interval prevailing between two successive "pips" in this track 37 will, therefore, indicate with precision the time duration of the corresponding interval during which tape motion is intended, as contrasted with the interval (shown on tracks 38 and 39) during which the tape actually moves. The "waiting time" represented by the space "a" or the space "b" on film 35 will, of course, be a measure of motor inertia, tape slippage, and any other factor entering into the creation of these time differentials.

Film track 38, produced by the E.M.F. developed in the magnetic reading head as the tape 12 travels past said head, will have its amplitude proportional to the instantaneous speed of the tape (assuming constant intensity of the magnetic track 19 on tape 12), hence there will be a period of amplitude build-up as the tape accelerates, and a period of attenuation as the tape decelerates. The contours and spacings of these amplitude changes will, of course, indicate characteristics of the accelerating and decelerating actions. Film track 38 will also indicate average tape speed, since the space between successive nodes, being substantially uniform for the major part of each cycle, is directly proportional to basic tape speed.

Film track 39, representative of the signal produced by optical pick-off device 22, will also serve to indicate average tape speed over small time increments, but its principal value is in its capacity (due to its full amplitude even at low speeds) for more distinctly and more accurately depicting the precise instant when the tape begins to move, or stop moving.

Procedures for converting the film track information to the form of graphs, such as the graphs shown in Figs. 6, 7, and 8, may utilize the following formula:

$$V_f = f_0 \lambda_0 \quad (1)$$

wherein $V_f$ represents the film speed in inches per second;
$f_0$ the time base frequency in cycles per second; and
$\lambda_0$ the wave length of the photographic record of the time base, in inches per cycle;

$$\Delta t = \frac{\lambda_{fm}}{V_f} \quad (2)$$

wherein $\Delta t$ represents the actual time required for the tape to move one wave length of the magnetic record;
$\lambda_{fm}$ the wave length of the photographic record constituting track 39; and
$V_f$ the film speed, as above noted;

$$t_a = \frac{Y_0 + Y_i}{V_f} \quad (3)$$

wherein $t_a$ represents the total time lapse from the point of receipt of the "go" pulse to the point on track 38 (see Fig. 3) constituting the point of attainment of full tape speed;
$Y_0$ and $Y_i$ are the distances so marked on Fig. 3; and
$V_f$ is the film speed, as above noted;

$$V_a = \frac{\lambda_m}{\Delta t} \quad (4)$$

wherein $V_a$ represents the average tape speed during a time increment $\Delta t$ (defined above); and
$\lambda_m$ represents the wave length of the magnetic record.

Substituting for $\Delta t$ (in Equation 4) the values indicated in Equation 2, there is derived:

$$V_a = \frac{\lambda_m V_f}{\lambda_{fm}} \quad (5)$$

Substituting for $V_f$ (in Equation 5) the values indicated in Equation 1, there is derived:

$$V_a = \frac{\lambda_0 f_0 \lambda_m}{\lambda_{fm}} \quad (6)$$

With well functioning equipment $f_0$, $\lambda_0$, and $\lambda_m$ are constant (or very nearly so) and $\lambda_{fm}$ is inversely proportional to the tape speed. Other pertinent formulas are:

$$v = V \frac{x_p}{x} \quad (7)$$

wherein $v$ represents instantaneous tape speed, in inches per second;
$V$ is the steady state tape velocity; and
$x$ and $x_p$ are the distances so marked on Fig. 3;

$$\Delta s_j = V_a \Delta t \quad (8)$$

wherein $\Delta s_j$ is the tape displacement in a small interval from "$n$" to "$n+1$";
$V_a$ has the value noted in Equation 6; and
$\Delta t$ is the time lapse for the said interval;

$$a = \frac{\Delta V}{\Delta t} \quad (9)$$

wherein $a$ is the acceleration during a time increment $\Delta t$, and $\Delta V$ is the velocity increment for such time increment.

That is, as the slope of the velocity curve is the measure of the acceleration, it follows that acceleration can be determined by direct measurements on the velocity curve itself. Similarly, the displacement of the tape may be computed by counting the number of wave lengths of track 38 or 39.

Fig. 2 shows the invention applied to a cam follower 50 reciprocated by a cam 51 rotated by a motor 52 whose energizing circuit is adapted for opening and closing by a switch 53. A second switch 54, of high speed characteristics, is mounted alongside cam 51 for momentary closure at one point in each cycle of rotation of cam 51, the latter carrying a switch-actuating pin 55 for this purpose. The contacts of microswitch 54 are in series with a winding 56 of a transformer 57, said winding 56 being supplemented by a second winding 58 adapted for energization by a winding 59 on magnetic reading head 60. Head 60 is mounted adjacent to a magnetically coated surface 61 on cam follower 50, and may also carry a second current-generating winding connecting directly to the beam-deflecting electrodes of cathode ray tube 67, constituting one of four cathode ray tubes, 65 to 68, whose visual voltage patterns are recordable on a motor driven camera film (not shown) corresponding to the film 35 of Fig. 1. The operating electrodes of tube 65 receive voltage from oscillating signal generator 60 (corresponding to generator 1 of Fig. 1); the electrodes of tube 66 receive "stop" and "go" impulses in response to successive closings and openings of switch 53; and the electrodes of tube 68 receive amplified energy from the secondary winding 64 of transformer 57. A fragment of the film 69, with the resultant recordings developed thereon, is shown in Fig. 4. On said film 69 the tracks 36a, 37a, 38a and 39a correspond to those similarly designated in Fig. 3, but there is an additional pulse, 40a, recording the cyclic operations of switch 54. Tracks 38a and 39a both have their origin in reading head 60, but as the circuit developing track 39a passes through transformer 57, the tube 68 will operate at higher gain than tube 67, hence track 39a will be more distinct than track 38a, especially at low cam follower speeds.

Fig. 9 shows the invention applied to a Geneva type of "star" wheel drive by magnetically coating an annular surface 70 on one side of a star wheel 71, and arranging a magnetic reading head 75 opposite thereto. The wheel 71 is rotated through cycles of 180 degrees, separated by idle periods during which the driving wheel 72 "over-runs" through an arc of about forty degrees, after which a new set of driving pins 73 successively mesh with the teeth 74 of the star wheel.

Wheel 72 is driven by motor 76 and carries a pin 77 for actuation of microswitch 78, corresponding to switch 54 of Fig. 2. Electrical connections link motor 76, switch 78, and magnetic head 75 to cathode ray tubes 66', 67', and 68', corresponding to tubes 66, 67, and 68 of Fig. 2, and the system is completed by the addition of units 57', 60', and 65', corresponding to those shown at 57, 60, and 65 in Fig. 2. The resulting pattern on the recording film will be as indicated in Fig. 10, wherein the individual tracks are designated like their counterparts in Fig. 4.

As used herein, the words "magnetically coated" include impregnation or any other treatment producing an equivalent effect, and the expression "machine element" includes the tape and tape drive of Fig. 1 as well as the machine elements of Figs. 2 and 9, and equivalents thereof.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A dynamic motion analysis system comprising a member adapted to be moved with respect to a reference point, first and second patterns disposed side by side on said member, each of said patterns being representative of a constant frequency signal, first and second signal sensing means fixedly disposed with respect to said reference point, said first signal sensing means cooperating with said first pattern to provide a first alternating electrical signal having an amplitude proportional to the velocity of said member with respect to said reference point, said second signal sensing means cooperating with said second pattern to provide a second alternating electrical signal of substantially constant amplitude and having a frequency proportional to the velocity of said member relative to said reference point, and first and second recording means respectively actuated by said first and second signals to provide a visible permanent record of said signals side by side on a common recording surface.

2. The apparatus of claim 1 and further comprising a magnetic and a transparent material disposed side by side on said member, said first pattern being magnetically recorded on said magnetic material, said first signal sensing means comprising a magnetic signal reading head positioned in cooperating relationship with said first pattern, said second pattern being visibly recorded on said transparent material, a light source positioned on one side of said transparent material, said second signal sensing means comprising a photoelectric element positioned on the other side of said transparent material and aligned with said light source and said second pattern.

3. The apparatus of claim 1 and further comprising means for electrically actuating said member, means for deriving a third electrical signal in accordance with the energization of said actuating means, means for providing an electrical reference signal of constant amplitude and frequency, and means for providing a visible permanent record of said last-recited signals on said common recording surface side by side with the record of said first and second signals.

References Cited in the file of this patent
UNITED STATES PATENTS

| | | |
|---|---|---|
| 1,685,667 | Davis | Sept. 25, 1928 |
| 2,158,874 | Kolb | May 16, 1939 |
| 2,275,316 | Ritzmann | Mar. 3, 1942 |
| 2,378,389 | Begun | June 19, 1945 |
| 2,423,440 | De Neergaard | July 8, 1947 |
| 2,537,105 | Urick et al. | Jan. 9, 1951 |
| 2,540,654 | Cohen et al. | Feb. 6, 1951 |
| 2,604,955 | Hawkins | July 29, 1952 |
| 2,628,539 | Neergaard | Feb. 17, 1953 |
| 2,632,815 | Crespinel | Mar. 24, 1953 |
| 2,680,669 | Shepard et al. | June 8, 1954 |
| 2,688,897 | Palm | Sept. 14, 1954 |
| 2,776,867 | Boyan | Jan. 8, 1957 |
| 2,793,344 | Reynolds | May 21, 1957 |
| 2,877,415 | Rolle | Mar. 10, 1959 |